United States Patent
Coleman et al.

[11] Patent Number: 5,913,453
[45] Date of Patent: Jun. 22, 1999

[54] BREAKER-BREAKER LOLLIPOP HOLDER AND PRODUCT DISPENSING DEVICE

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 08/839,572
[22] Filed: Apr. 15, 1997
[51] Int. Cl.⁶ .................................................. A24F 15/04
[52] U.S. Cl. .............................................. 221/24; 221/248
[58] Field of Search ............................. 221/24, 248, 190, 221/187, 186, 289, 269, 155, 229

[56] References Cited

U.S. PATENT DOCUMENTS 5,385,267  1/1995  Diamond et al. ...................... 221/24

*Primary Examiner*—Kenneth Noland
*Attorney, Agent, or Firm*—Melvin L. Crane

[57] ABSTRACT

A candy holding and dispensing device which combines a lollipop with loose candy or gum pieces in one convenient holder. The device comprises a main housing of clear plastic which contains loose candy or gum pieces. The upper end of the main housing is provided with an aperture to which a lollipop is secured. The upper end or lower end of the housing can be made with threads so it can be separated. The main housing can also be made with threads so the main housing can be refilled with candy or gum pieces or it can be made as a self-contained non-refillable main housing. The lower end of the main housing contains a spring and a dispensing shaft which has slots for dispensing candy or gum pieces near the top of the shaft. The end of the dispensing shaft extends out of the lower end cap of the main housing. To dispense the candy or gum pieces, the dispensing shaft is pressed upwards compressing the spring allowing the top of the shaft with the slots to extend into the main housing that contains the candy or gum pieces. As the top of the dispensing shaft is pressed into the main housing and held, the candy or gum pieces enter into the slots of the dispensing shaft and are dispensed out through the dispensing shaft.

6 Claims, 2 Drawing Sheets

BREAKER-BREAKER LOLLIPOP HOLDER AND PRODUCT DISPENSING DEVICE

This invention is directed to a pop holder and product dispensing device which is hand-held and operable by most any person.

REFERENCE TO PRIOR ART

Heretofore, product dispensing devices have been used for dispensing gum balls, pieces of candy, novelty devices, etc. Such devices have made use of cylindrical or spherical containers which contain the product and the product is dispensed by insertion of a coin and rotating a mechanical mechanism which picks up and removes a piece of the product to an outlet. Other devices have been used which are spring loaded and a piece of the product is removed by opening an opening. The spring forces the product up to the opening through which the product is removed. Such a device has been set forth in U.S. Pat. No. 5,178,298. Another dispensing device has been set forth in U.S. Pat. No. 5,385,267.

BRIEF SUMMARY OF THE INVENTION

This invention is directed to a device on which a lollipop can be secured to an upperend which includes a reservoir housing in which pieces of loose candy or small gum pieces can be placed and dispensed as desired for consumption.

It is therefore an object of the invention to provide a device which can be used for holding a lollipop during consumption.

Another object is to provide a device which not only holds a lollipop for consumption but also contains a reservoir for holding loose pieces of candy or gum which can be dispensed as desired.

Another object is to provide a device in which the candy or gum can be stored in a sanitary container for dispensing the candy or gum as desired.

Other objects and advantages of the invention will become clearer for an understanding of the disclosure including the drawings.

DETAILED DESCRIPTION

Figure 1:
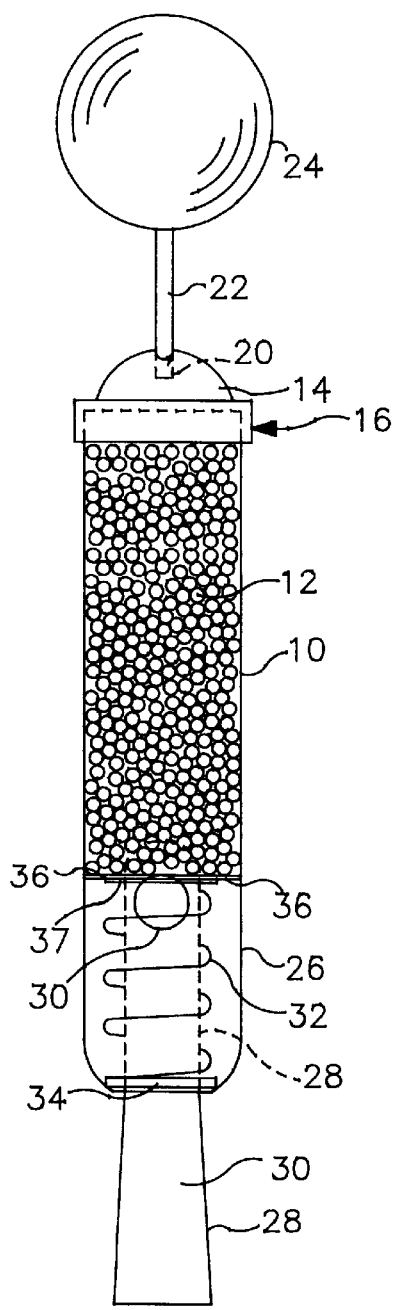
FIG. 1 illustrates a side view of the device filled with small pieces of a product and a lollipop held in the top cap.
Figure 2:
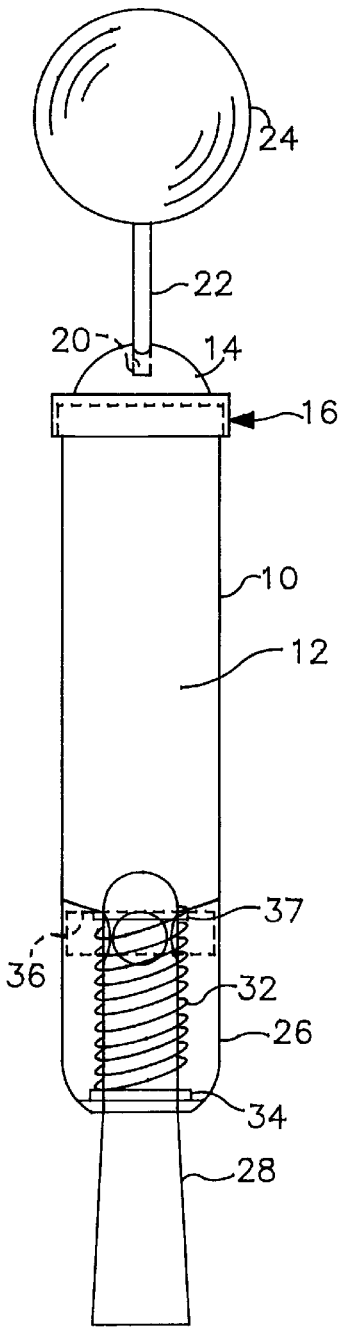
FIG. 2 illustrates a side view of the device shown without a product and illustrating a spring loaded dispensing device in a normal non-use position.
Figure 3:
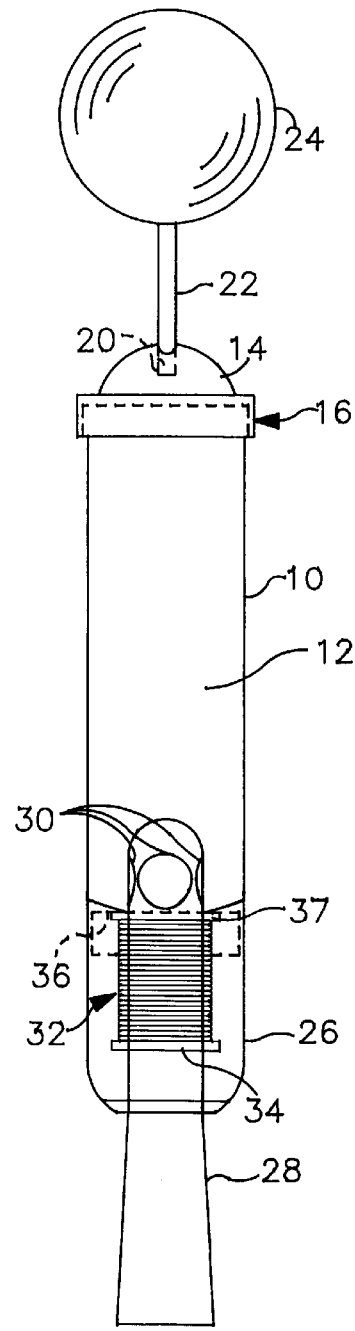
FIG. 3 illustrates a side view without any product but with the dispensing device in a dispensing position.

Now referring to the drawings where the same reference characters are used for the same parts throughout the drawings, FIG. 1 shows a lollipop holder-candy dispenser which includes a main housing 10 which includes small candy, gum or any other product 12. The housing is secured to an upper end housing 14 by a tight fit 16, or by matching threads 18 or by any other means. The upper end housing is provided with a central aperture 20 which receives an end of a lollipop stick 22. The aperture 20 supports the lollipop 24 and permits replacement of the lollipop when the lollipop has been consumed. The lollipop could be packaged as a separate piece for shipping and selling the device. The device could also be sold without the lollipop for use with a lollipop purchased separately.

Figure 4:
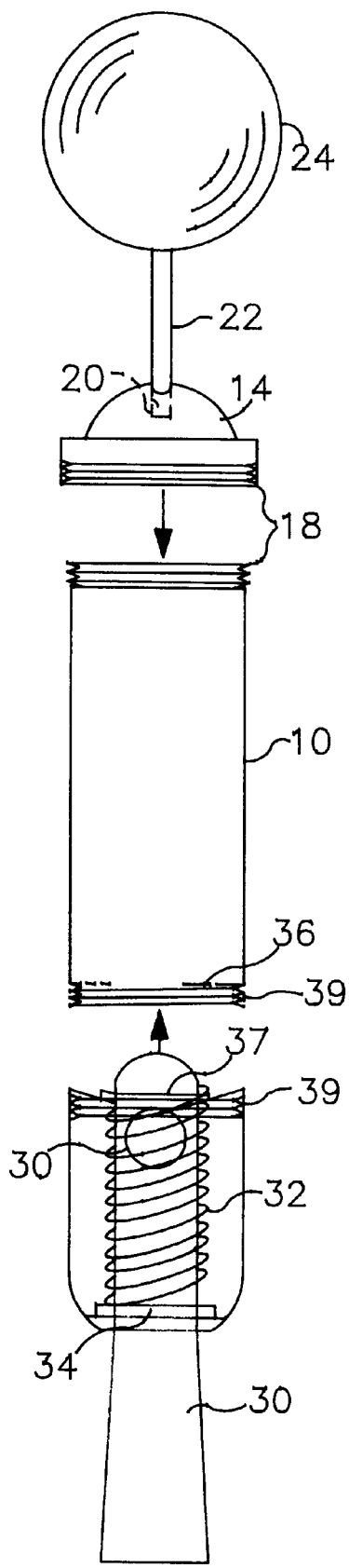
FIG. 4 illustrates the device separated into the different parts.

A lower end cap 26 encloses the bottom of the housing. The lower end of the housing encloses a dispensing shaft 28 which is cylindrical and includes a central passage 30, has one portion that extends from the bottom of the lower end cap and one portion that is contained within the lower end cap. The portion contained within the lower end cap is surrounded by a coil spring 32 which is seated on a lower spring support 34 which is secured to the dispensing shaft 28. The upper end of the spring seats on a collar 37 that loosely surrounds the dispensing shaft. The collar is then supported on a support 36 within the lower end of the housing which is fixed at the upper end of the threads 39 as shown in FIG. 4. If the lower end cap is not threaded onto the main housing, then the support would be below the bottom end of the main housing that protrudes into the upper end of the lower end cap. A spring support could be provided within the lower end of the main housing which would not only support the collar of the upper end of the spring but would retain the product within the main housing. The upper spring support 36 must have an axial aperture through which the upper end of the dispensing shaft passes in order to dispense the product. The collar is larger than the aperture in the upper spring support so that the collar does not pass through the aperture on the upper spring support 36.

In carrying out the use of the device, the product is placed into the main housing either from the upper end or the bottom end. If the product is added from the lower end of the housing, the product is fed through the aperture in the spring support provided the spring support is secured within the bottom of the main housing. Once the product has been added to the housing, the body parts are assembled together. In order to retrieve some pieces of the product in the main housing, the dispensing shaft is pushed upwardly. As the dispensing shaft is pushed upwardly, the collar upon which the upper end of the spring is seated, seats against the upper spring support 36. The upper end of the dispensing shaft is forced into the area including the product until the dispensing slots enter the area of product and the spring is compressed to apply a force on the lower spring seat. The product can then enter the dispensing slots and will drop through the dispensing shaft onto one's hand or into a container set below the dispensing shaft. Once the desired amount of the product has been dispensed, the dispensing shaft is released and the spring will force the dispensing shaft to its rest position with the upper end of the dispensing shaft within the aperture of the upper spring support so that the product will not fall through the aperture in the upper spring support.

Instead of the dispensing shaft having a passage along its length, the dispensing shaft could be solid up to the dispensing slots and the main housing or the lower end cap could have an outlet aperture opposite the rest position of the dispensing slots so that the product could enter the dispensing slots when raised and then be retained in the dispensing slots until the dispensing shaft is at its rest position, then the product could be dispensed through the outlet aperture in the main housing or the lower end cap. If such a modification is made, a partition will be required in the lower end cap just below the rest position of the dispensing slots and above the spring collar on which the upper end of the spring is seated. A partition will be necessary in the lower end of the main housing which would include an aperture through which the upper end of the dispensing shaft would extend. In fact, the length of the dispensing shaft would require to be lengthened in the area of the dispensing slots so that in a rest position of the dispensing slots, the upper end of the dispensing shaft would be inserted into the aperture of the partition in the main housing, and the dispensing slots would be in an area between the partition in the main housing and the partition in the lower end cap. The outlet in the device would be in a wall of the upper housing in the area between the two partitions. In such a modification, only a select number of pieces of the product would be removed in one operation of the dispensing shaft.

The lollipop in the upper end of the device can be assumed and replaced as desired without any regard related to the product in the main housing.

Figure 5:
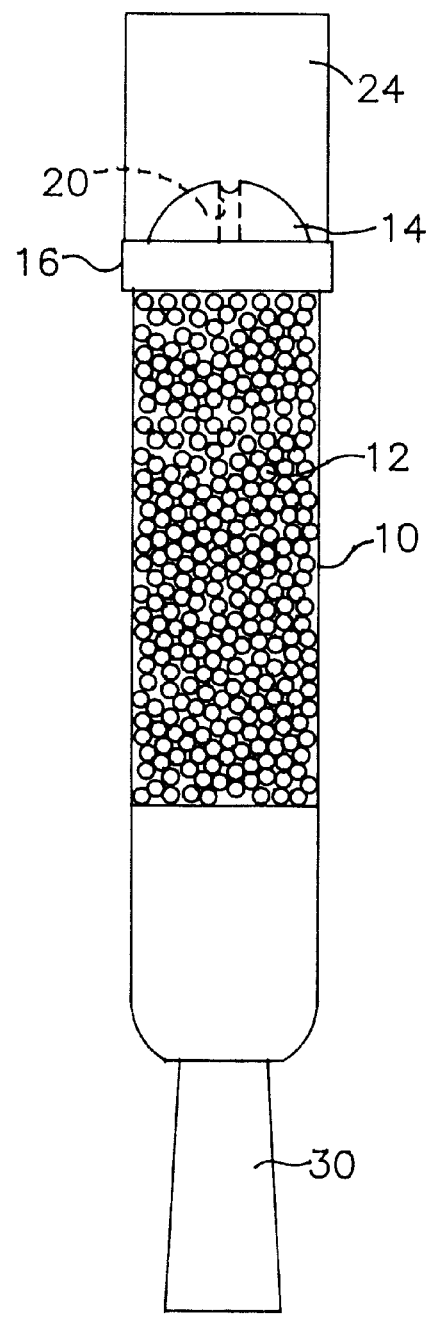
FIG. 5 illustrates a modification in which a sucker substance is secured directly to the upper end of the housing.

FIG. 5 is a modification of the device shown in FIGS. 1–4 where the housing and dispensing device is made as set forth above with an aperture for receiving one end of a candy stick. Instead of a lollipop being formed onto a stick and one end of the stick inserted into the aperture, the candy product is made directly onto the upper end of the housing. Once the candy has been consumed, then a lollipop on a stick can be secured to the upper end via the aperture and used for future consumption of many lollipops.

The foregoing relates to preferred exemplary embodiments of the invention, it being understood that other variants and embodiments thereof are possible within the spirit and scope of the invention, the latter being defined by the appended claims.

What is claimed is:

1. A lollipop holder and product dispenser which comprises:

a housing, said housing including a main housing, an upper end and a lower end, said main housing adapted to retain a plurality of small pieces of a product, said upper end including an aperture for securing one end of a lollipop stick, means for dispensing small pieces of said product from said main housing, said means for dispensing small pieces of the product is a spring-loaded dispenser that extends through said lower end of said housing into said main housing by which small pieces of the product are dispensed.

2. A lollipop holder and product dispenser as set forth in claim 1, in which one of said main housing and said lower end includes a partition by which the product is retained in the housing.

3. A lollipop holder and product dispenser as set forth in claim 2 in which said partition includes an aperture through which an upper end of said spring loaded dispenser extends into said product for dispensing said small pieces of said product.

4. A lollipop holder and product dispenser as set forth in claim 3, in which dispensing slots are provided in said upper end of said spring loaded dispensing means for collecting some of said small pieces of said product, said spring loaded dispenser has a passage therethrough that extends from said dispensing slots to a bottom end of said spring loaded dispenser through which small pieces of the product is dispensed.

5. A lollipop holder and product dispenser which comprises, a main housing, said main housing including an upper end cap and a lower end cap, said main housing adapted to hold a product of small pieces, a dispenser means for dispensing pieces of said product from said main housing, said dispenser means including a dispenser shaft, at least one dispensing slot in an upper end of said dispenser shaft, a passage through said lower end cap, said dispenser means extends into said lower end cap with an upper end portion extending through said lower end cap and a lower end portion extending from a lower end of said lower end cap, a spring means within said lower end cap surrounding a portion of said dispenser means, said spring means having a lower end and an upper end, a first spring seat secured to said portion of said dispenser shaft extending in said lower end cap, said lower end of said spring seats on said first spring seat, a collar surrounding said upper end of said dispenser means, said collar forms a second seat for an upper end of said spring, a partition within one of said main housing and said lower end cap, said partition lying above said collar, said partition having an aperture through which said dispensing slotted end of said dispensing means extends into said product in said main housing for dispensing said product.

6. A lollipop holder and product dispenser which comprises:

a housing, said housing including a main housing, an upper end and a lower end, said main housing adapted to retain a plurality of small pieces of a product, said upper end including an aperture for securing one end of a lollipop stick, a candy product formed on said upper end of said housing, means for dispensing small pieces of said product from said main housing, said means for dispensing small pieces of the product is a spring-loaded dispenser that extends through said lower end of said housing into said main housing by which small pieces of the product are dispensed.

* * * * *